(12) United States Patent
Rasanen

(10) Patent No.: US 7,916,726 B2
(45) Date of Patent: Mar. 29, 2011

(54) CONTROLLING TRANSPORTATION OF DATA PACKETS

(75) Inventor: Juha A. Rasanen, Espoo (FI)

(73) Assignee: Nokia Corporation, Espoo (FI)

( * ) Notice: Subject to any disclaimer, the term of this patent is extended or adjusted under 35 U.S.C. 154(b) by 979 days.

(21) Appl. No.: 10/922,977

(22) Filed: Aug. 23, 2004

(65) Prior Publication Data

US 2005/0129013 A1 Jun. 16, 2005

(30) Foreign Application Priority Data

Dec. 11, 2003 (GB) .................................. 0328756.2

(51) Int. Cl.
H04L 12/28 (2006.01)
(52) U.S. Cl. ....................................... 370/392; 370/401
(58) Field of Classification Search .................. 370/392, 370/401
See application file for complete search history.

(56) References Cited

U.S. PATENT DOCUMENTS

| | | | |
|---|---|---|---|
| 5,570,366 A * | 10/1996 | Baker et al. ................... | 370/312 |
| 6,212,184 B1 * | 4/2001 | Venkatachary et al. ....... | 370/392 |
| 6,801,528 B2 * | 10/2004 | Nassar ........................... | 370/389 |
| 6,922,786 B1 * | 7/2005 | Ong .............................. | 713/154 |
| 6,993,360 B2 * | 1/2006 | Plahte et al. .................. | 455/555 |
| 7,149,219 B2 * | 12/2006 | Donahue ....................... | 370/392 |
| 7,209,491 B2 * | 4/2007 | Zheng et al. .................. | 370/477 |
| 7,246,173 B2 * | 7/2007 | Le et al. ........................ | 709/238 |
| 7,283,529 B2 * | 10/2007 | Basso et al. .................. | 370/392 |
| 7,522,627 B2 * | 4/2009 | Lam et al. ..................... | 370/427 |
| 7,554,949 B2 * | 6/2009 | Chen ............................. | 370/331 |
| 2002/0024974 A1 * | 2/2002 | Karagiannis et al. ......... | 370/516 |
| 2002/0073215 A1 * | 6/2002 | Huitema et al. .............. | 709/230 |
| 2002/0124084 A1 * | 9/2002 | Furukawa et al. ............ | 709/225 |
| 2002/0152321 A1 * | 10/2002 | Le et al. ........................ | 709/238 |
| 2004/0146045 A1 * | 7/2004 | Jimmei et al. ................ | 370/351 |
| 2004/0205359 A1 * | 10/2004 | Matsuhira ..................... | 713/201 |
| 2006/0036768 A1 * | 2/2006 | Furukawa et al. ............ | 709/245 |

FOREIGN PATENT DOCUMENTS

| | | |
|---|---|---|
| EP | 1 156 626 A2 | 11/2001 |
| EP | 1 367 780 A1 | 12/2003 |
| WO | WO 01/91389 A2 | 11/2001 |
| WO | WO 02/23831 A1 | 3/2002 |

* cited by examiner

Primary Examiner — Daniel J Ryman
Assistant Examiner — Jay P Patel
(74) Attorney, Agent, or Firm — Mintz Levin Cohn Ferris Glovsky and Popeo, P.C.

(57) ABSTRACT

A method for transport control in a packet switched communication system is disclosed. In the method a data packet assigned with a destination address is received at a node. It may then be detected that the destination address does not meet a filtering criteria. It may then be checked if at least one further destination address has been assigned for the data packet. If it is found that at least one further destination address is assigned for the data packet, the filtering criteria is applied to the at least one further destination address. The data packet is forwarded from the node to a next node in response to detection that the data packet is assigned with a further destination address that meets the filtering criteria.

24 Claims, 3 Drawing Sheets

CONTROLLING TRANSPORTATION OF DATA PACKETS

BACKGROUND OF THE INVENTION

1. Field of the Invention

This disclosure relates to controlling transportation of data packets, and in particular, but not exclusively, to control of data packets via a node provided with a filtering function.

2. Description of the Related Art

A communication system can be seen as a facility that enables communication sessions between two or more entities such as user equipment and/or other nodes associated with the system. Establishment of a communication session enables a user to be provided with various services. The communication may comprise, for example, communication of voice, video or other audio and/or image data, multimedia or any other data. A session may, for example, comprise a two-way telephone call or multi-way conference session or connection between a user equipment and an application server (AS), such as a service provider server or a proxy.

A communication system typically operates in accordance with a given standard or specification which sets out what the various entities associated with the communication system are permitted to do and how that should be achieved. For example, the standard or specification may define if the user, or more precisely, user equipment is provided with a circuit switched service and/or a packet switched service. Communication protocols and/or parameters which shall be used for the connection may also be defined. In other words, a specific set of "rules" on which the communication can be based on needs to be defined to enable communication by means of the system.

Signalling is an example of functions that is commonly defined in an appropriate communication protocol or protocols. Signalling between various entities associated with a communication session is typically required in order to control the communication session. Control is typically required for the set-up of the communication session and also later on during communication on the established communication session.

The communication may be provided by fixed line and/or wireless communication interfaces. Examples of fixed line systems include a public switched telephone network (PSTN), a local area network (LAN) and any other data network provided by means of fixed connections between the nodes thereof. The wireless communication may be provided, for example, by means of a mobile communication system or wireless local area networks (WLANs). Mobile communication systems refers generally to any telecommunications systems which enable a wireless communication when users are moving within the service area of the system. An example of a typical mobile communication system is a Public Land Mobile Network (PLMN).

The mobile communications network can provide an access network providing a user with a wireless access to external networks, hosts, or services offered by specific service providers. The user may need to have a subscribership with the mobile communications system in order to be able to use the services of the mobile system. The mobile subscription information of the subscriber may indicate parameters such as parameters regarding the quality of service (QoS) the subscriber is entitled to receive, priorities, service restrictions, security, authentications, and so on.

An access point or gateway node of the mobile communication network provides further access to an external network or an external host. For example, if the requested service is provided by a service provider located in another network, the service request is routed via a gateway to the other network and the service provider.

Various user equipment (UE) such as computers (fixed or portable), mobile telephones and other mobile stations, personal data assistants or organizers, and so on may be used for accessing packet switched services. Mobile user equipment, typically referred to as a mobile station (MS), can be defined as a means that is capable of communication via a wireless interface with another device such as a base station of a mobile telecommunication network or any other station. The increasing popularity of Third Generation (3G) communication systems will, in all likelihood, significantly increase the possibilities for accessing services on the packet data networks via mobile user equipment (UE) as well as other types of UE.

The term "service" used above and hereinafter will generally be understood to broadly cover any service or goods which a user may desire, require or be provided with. The term also will generally be understood to cover the provision of complementary services. In particular, but not exclusively, the term "service" will be understood to include browsing, downloading, email, streaming services, Internet Protocol (IP) multimedia (IM) services, conferencing, telephony, gaming, rich call, presence, e-commerce and messaging, for example, instant messaging.

A more detailed example of a wireless packet switched communication system will now be described with reference to general packet radio service (GPRS). The GPRS operational environment comprises one or more subnetwork service areas, which are interconnected by a GPRS backbone network. Each subnetwork may comprise a number of packet data service nodes (SN). In this specification the service nodes will be referred to as serving GPRS support nodes (SGSN). Each of the SGSNs is connected to radio networks, typically to base station systems and/or radio access networks by way of base station controllers (BSC) and/or radio network controllers (RNC) in such a way that they can provide a packet service for mobile user equipment via several base stations. The intermediate mobile communication network provides packet-switched data transmission between a support node and mobile user equipment. The subnetworks are in turn connected to an external data network, e.g. to a packet data network (PDN), via GPRS gateway support nodes (GGSN). The GPRS thus allow transmission of packet data between mobile user equipment and external data networks.

A packet data protocol (PDP) context may be established to carry traffic flows over the packet switched communication system. A PDP context typically includes a radio access bearer provided between the user equipment, the radio network controller and the SGSN, and switched packet data channels provided between the serving GPRS service node (SGSN) and the gateway GPRS service node (GGSN). A session between the user equipment and other party would then be carried on the established PDP context. A PDP context can carry more than one traffic flow, but all traffic flows within one particular PDP context are treated the same way as regards their transmission across the network. This requirement regarding the similar treatment is based on PDP context treatment attributes associated with the traffic flows. These attributes may comprise, for example, quality of service and/or charging and/or filtering attributes. From the above mentioned functions filtering generally refers to operations wherein it is checked if the address information in the data packet matches a filtering criteria. If a data packet passes the filter, the packet is allowed to be forwarded to a next router. If a data packet does not meet the predefined criteria, it is commonly dropped.

A policy controller entity, for example a policy decision function (PDF), can be provided for controlling the transport layer of a PDP context. The policy decision function (PDF) may be provided by any appropriate controller entity. The PDF and GGSN are commonly arranged to communicate information to enable co-operation between the GPRS bearer level and the IMS level of the communication system. The PDF may be used for storing attributes for the purposes of functions such as the Quality of Service, filtering of data packet in the GGSN and so on.

An IP Multimedia Service (IMS) session related set of binding information generated by a policy decision function (PDF) and sent via the user equipment, to the GGSN can be used to verify that the PDP context operations requested by the user equipment comply with the preceding negotiation on the IMS level during the set-up or modification of the PDP context. As a result of the verification, the PDF authorizes QoS parameters for the GGSN. The authorized parameters sent by the PDF to the GGSN may include, among other things, filter parameters known as Packet Classifiers. Packet Classifiers can be used by the GGSN to filter the user plane traffic, both uplink and downlink, in the relevant PDP context. Packet Classifier parameters are commonly derived from signalling, for example from SDP/SIP (Session Description Protocol/Session Initiation Protocol) signalling. Packet Classifiers may employ information about source address, source port, destination address, destination port and protocol.

When a user equipment sending data packets defines a route through the network, for example by using the Internet Protocol version 6 (IPv6) Routing Header, the user equipment may define additional routing information. For example, the sending user equipment may indicate a specific route that the data packets shall follow when communicated over the network. To implement this, it is possible to define the destination address in each data packet at the time of sending thereof such that the destination address of the data packet is the address of the next router in the selected route, and not the actual i.e. final destination address.

However, typically the filtering criteria is based on the address of the final destination. Thus the filtering criteria used by a Packet Classifier or any other appropriate filtering mechanism used by a node may not be based on the address of the next node but is instead based on the final destination address. That is, the filtering function of a node is not necessarily made aware that the destination address assigned for a data packet by a user equipment or a previous node is not the final destination address of that data packet. Thus the node would still apply a filtering criteria that is based on the final destination address on that data packet. As a result of this the filtering process may drop the packets because they do not match the filtering criteria. Thus the transmission of packets may fail.

SUMMARY OF THE INVENTION

Embodiments of the present invention aim to address the problems associated with the use of non-matching filtering criteria.

According to one embodiment there is provided a method for transport control in a packet switched communication system. The method comprises receiving in a node a data packet assigned with a destination address and detecting that the destination address does not meet a filtering criteria. It is then checked if at least one further destination address has been assigned for the data packet. If it is found that at least one further destination address is assigned for the data packet, the filtering criteria is applied to the at least one further destination address. The data packet is forwarded from the node to a next node in response to detection that the data packet is assigned with a further destination address that meets the filtering criteria.

According to another embodiment there is provided a node for a packet switched communication system. The node comprises an input for receiving data packets assigned with at least one destination address and an output for forwarding data packets to another node based on the destination address. Control means for checking if at least one additional destination address has been assigned for a data packet and a filter for filtering destination addresses of received data packets are also provided. The configuration of the node is such that a data packet whose destination address does not meet a filtering criteria is nevertheless forwarded from the node if it is detected that the data packet is assigned with an additional destination address that meets the filtering criteria.

According to yet another embodiment there is provided a communication system provided with a node as described above.

The embodiments may provide a solution wherein an intermediate node, for example a gateway or another router does not drop a data packet even if an address checked based on a filtering criteria does not meet the filtering criteria. A more specific embodiment provides improved compatibility between data packet routing methods allowing changing destination addresses and a policy control function that is based on a final destination address or other one address. In some embodiments filter criteria of an intermediate router is updated to take into account the changed address.

BRIEF DESCRIPTION OF THE DRAWINGS

For better understanding of the present invention, reference will now be made by way of example to the accompanying drawings in which.

DETAILED DESCRIPTION OF THE PREFERRED EMBODIMENTS

Figure 1:
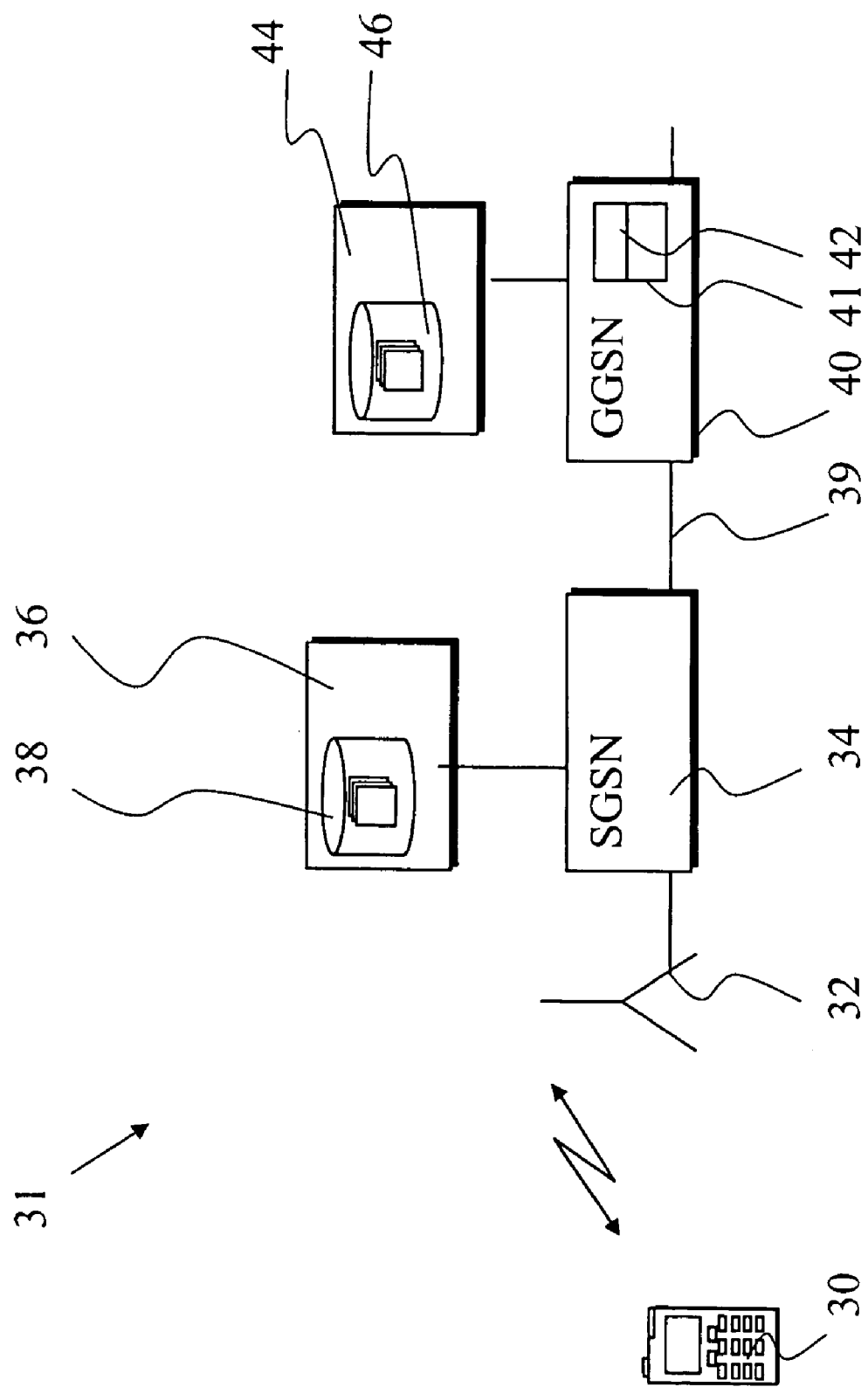
FIG. 1 shows schematically a communication system wherein the present invention may be embodied.

FIG. 1 shows a communication system suitable for embodying the present invention. More particularly, certain embodiments of the present invention will be described by way of example, with reference to the architecture of a third generation (3G) mobile communications system of FIG. 1. However, it will be understood that the invention may be applied to any other suitable form of packet switched network.

FIG. 1 shows a mobile user equipment 30. The basic operational principles of a mobile user equipment, that may also be referenced to as a mobile station, are generally known by those skilled person. A mobile user equipment is normally configured for wireless communication with other stations, typically with the base stations of a mobile communication system for enabling mobility thereof. A mobile user equipment may include an antenna element for wirelessly receiving and/or transmitting signals from and/or to the base stations of the mobile communication system. A mobile user equipment may also be provided with a display for displaying images and/or other graphical information for the user of the mobile user equipment. Speaker means are also typically provided. The operation of the mobile user equipment may be controlled by means of an appropriate user interface, such as control buttons, voice commands and so on. Furthermore, a mobile user equipment is typically provided with a processor entity and/or a memory means. The memory means, or other types of computer readable medium, may include computer code, including program code or instructions, configured to execute on the processor entity, or other computer-based devices, procedures such as a method for transport control in a packet switched communication system, as more particularly described herein. Communication between the user equipment and the entities of the communication network may be based on any appropriate communication protocol. A user may use the mobile user equipment for tasks such as, but not limited to, for making and receiving phone calls, for receiving and sending data from and to the network and for experiencing, for example, multimedia content by means of PDP contexts. For example, a user may access the network by means of a Personal Computer (PC), Personal Data Assistant (PDA), mobile station (MS) and so on.

A mobile communication system, in turn, may logically be divided between a radio access network (RAN) and a core network (CN). In the simplified presentation of FIG. 1, the base station 32 belongs to the radio access network. It shall be appreciated that, although, for clarity, FIG. 1 shows the base station of only one radio access network, a typical communication network system usually includes a number of radio access networks. It shall also be understood that the mobile communication system 31 of FIG. 1 may be arranged to serve a plurality of mobile user equipment 30.

The 3G radio access network (RAN) is typically connected to an appropriate core network entity or entities such as, but not limited to, a serving general packet radio service support node (SGSN) 34. A subscriber information database entity 36 for storing information associated with the subscriber of the user equipment 30 is also shown. The HLR may contain various records 38 associated with the subscriber, such as details of PDP context subscriptions of the subscriber.

A user equipment within the radio access network may communicate with a radio network controller via radio network channels which are typically referred to as radio bearers (RB). These radio network channels may be set up in a mobile communication system in a known manner. Each user equipment 30 may have one or more radio network channels open at any one time with the radio network controller. The radio access network controller is in communication with the serving GPRS support node 34 via an appropriate interface, for example on an Iu interface.

The serving GPRS support node 34, in turn, typically communicates with a gateway GPRS support node 40 via the GPRS backbone network on interface 39. This interface is commonly a switched packet data interface. The serving GPRS support node (SGSN) 34 and/or the gateway GPRS support node (GGSN) 40 are for provision of support for GPRS services in the network. The exemplifying GGSN 40 of FIG. 1 is shown to be provided with a filter means 41 and a controller 42 configured to control the operation of the node in accordance with the principles of the invention.

Overall communication between user equipment 30 in the access entity and the gateway GPRS support node 40 is generally provided by a packet data protocol (PDP) context. Each PDP context usually provides a communication pathway between a particular user equipment and the gateway GPRS support node 40. Once established, a PDP context may carry multiple flows. Each flow normally represents, for example, a particular service and/or a component of a particular service.

The PDP context therefore often represents a logical communication pathway for one or more flows across the network. To implement the PDP context between user equipment 30 and the serving GPRS support node 40, radio access bearers (RAB) are usually established which commonly allow for data transfer for the user equipment. The implementation of these logical and physical channels is known to those skilled in the art and is therefore not discussed further herein.

The user equipment may connect, via the GPRS network, to servers that are generally connected to an external packet data network, for example to an Internet Protocol (IP) network.

FIG. 1 shows a policy controlling entity, hereinafter referred to as the policy decision function (PDF) 44. The policy decision function (PDF) 44 may be provided by an appropriate controller entity. The policy decision function may be provided with an appropriate database 46 for storing information required by the policy control operations. A non-limiting example for the appropriate controller is an Internet Protocol Session Control (IPSC) entity.

A session related set of binding information may be generated by the policy decision function (PDF) 44 and sent via the user equipment to the GGSN 40 for use in checking that the PDP context operations requested by the user equipment 30 comply with the preceding negotiation on the IMS level. As a result of the verification, the PDF 44 authorizes QoS parameters for the GGSN 40.

The authorized parameters sent by the PDF 44 to the GGSN 40 may include, among other things, appropriate filtering criteria. For example, Packet Classifiers may be provided for the gateway 40. Packet Classifiers may be based on information about source address, source port, destination address, destination port and protocol. As explained above, the Packet Classifiers can be used by the GGSN 40 to filter the user plane traffic, both uplink and downlink, in the relevant PDP context.

The user equipment 30 sending data packets may define a route through the network, for example by including additional routing information in a routing header of a packet. An example of the routing headers is the IPv6 (Internet Protocol version 6) Routing Header. The routing header enables definition of a specific route the packet shall take to reach the final destination. The routing header may consist of router addresses that are swapped with the destination address of the packet, one by one on each hop, until the packet reaches its final destination. At sending, the destination address in the packet is the address of the first router in the wanted route. Thus the destination address in each packet may be the address of the next router in the selected route, this address being changed in each router.

Because of the changing destination addresses the filter address used by the Packet Classifier as filtering criteria may not match with the destination address of the packet. The following describes with reference also to FIGS. 2 and 3 some exemplifying embodiments how to avoid dropping of packets because the destination address thereof does not match the filter parameters.

Figure 2:
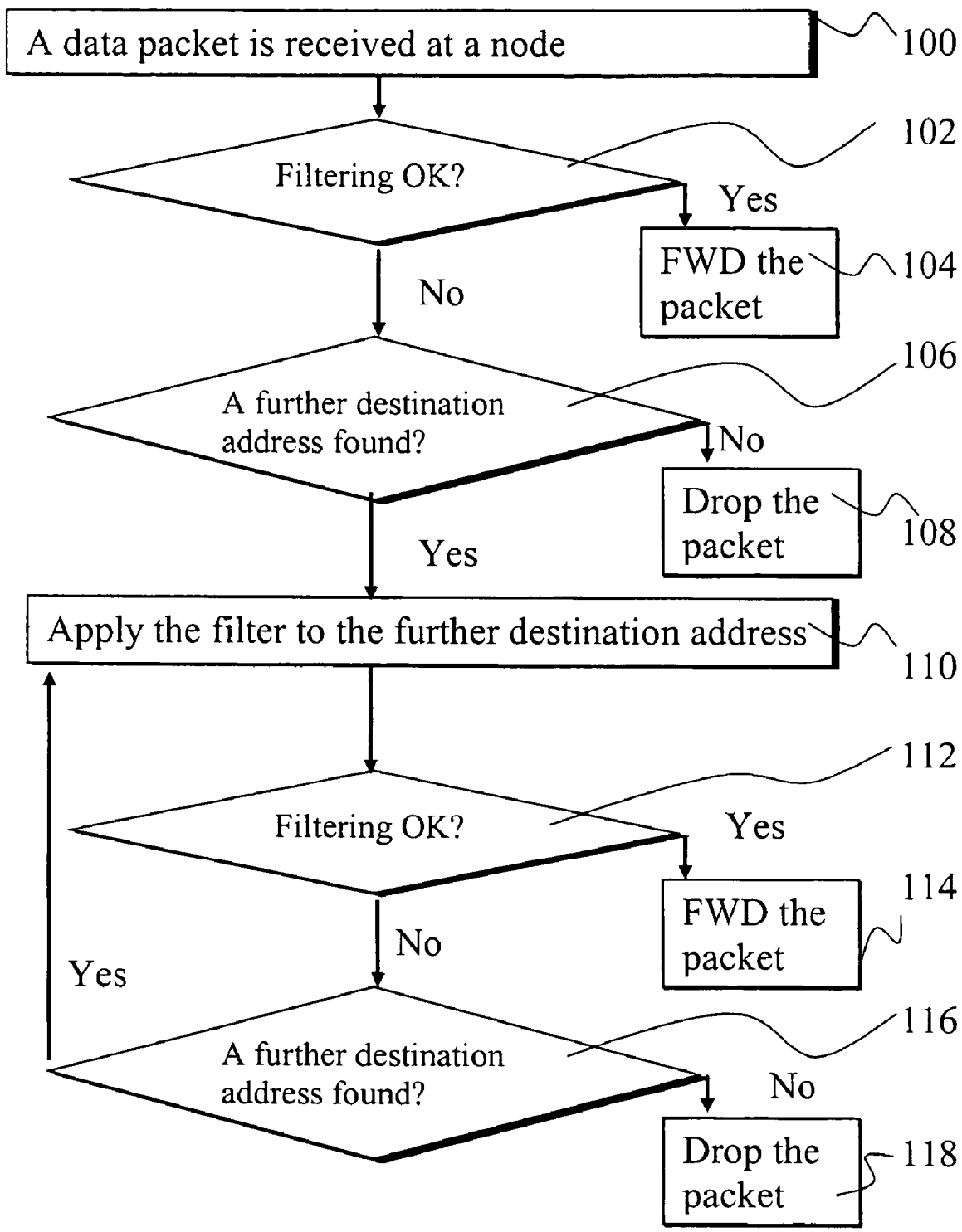
FIGS. 2 and 3 are flowcharts illustrating operation of two embodiments of the present invention.

In accordance with an embodiment shown in FIG. 2, when the GGSN 40 receives at step 100 an IPv6 packet on a policy controlled PDP context from the user equipment 30, the filter function 41 thereof may check if the destination address in the packet matches with a predefined filtering criteria. The GGSN 40 may find out at step 102 that the destination address in the data packet does not match the filtering criteria, for example, a destination address or a range of addresses of the uplink filter parameters. If so, the controller 42 of the GGSN may scan the extension headers of the data packet at step 106 to find out if the packet is provided with a routing header. The scanning may be accomplished e.g. by checking the next header fields of the packet.

If a routing header is found from the packet, the GGSN 40 looks for the final destination address from the routing header. This may be accomplished e.g. by employing parameters such as the 'Header Extension Length' and 'Segments Left'. If the final destination address is found, the filter is applied thereto at steps 110, 112 and it is checked if the final destination address matches the destination address (or range of addresses) of the uplink filter parameters.

If there is no match, the GGSN may discard the packet. The GGSN may inform the sender by sending an appropriate message informing the receiver thereof that the destination is unreachable.

If the addresses match, the GGSN sends the packet forward, see step 114.

FIG. 2 shows also a further possible embodiment in which the operation is looped such that even if the second address checked does not match the filter at step 112, the controller looks for further possible addresses, thus in practice returning to step 110. In accordance with this embodiment the packet is only dropped at step 118 when it has become clear that no such address can be found from the data packet that matches the filtering criteria.

Figure 3:
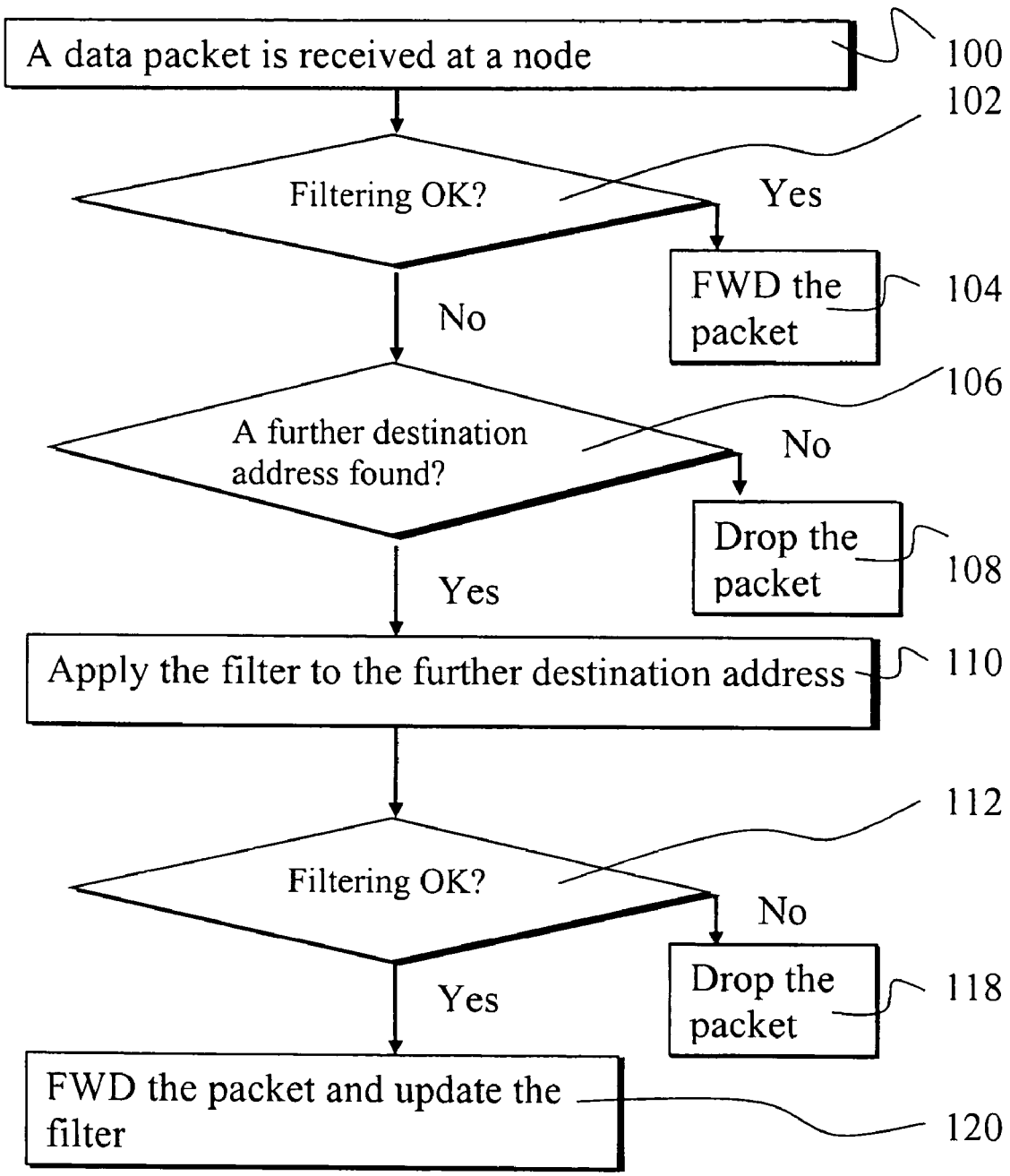

It shall be appreciated that the loop between steps 116 and 110 is not always necessary, or even preferred. As shown in FIG. 3, the data packet may be dropped at step 118 after the first further destination address or a limited number of addresses has been checked at step 112.

In accordance with an embodiment shown in FIG. 3 it is possible for the GGSN to update the filtering criteria at step 120. For example, the controller 42 may be configured to add the destination address of a data packet, i.e. the address of the next router in the selected route, which has passed the filter in step 112, to the destination address filter parameters of the uplink Packet Classifier filter. By means of this subsequent data packets sent by the user equipment 30 in the same PDP context with the same routing information will pass the filter function of GGSN 40 based on commonly used screening techniques without any further checks, i.e. without steps 106 to 112 of FIG. 3.

The updatable filtering criteria enables a user to start a session with one routing header and then change the routing header to another while keeping the first address the same. It is acknowledged that this might tempt a fraudulent user to try to pass data packets through the packet filter such that at least one of the remaining addresses of the subsequent packets is different from that of the first packet. The different addresses might be used to route the data packets to a different service/destination than what was indicated by the initial packet. However, the risk of unauthorised access of services is relatively low already for the reason that a user who sends packets to another server/service cannot receive any packets from that other server/service. This is so because the source address of that false destination would not match the downlink filter address, for example Ipv6 prefix, that is set up based on the Ipv6 prefix indicated by the original server at the SIP/SDP session establishment stage.

A further step may also be added to the screening procedure to improve security in this regards. In the further screening step, when further packets are being checked based on the address of the next router in the selected route as described above, a further check may be performed on the routing header to make sure that the user is not trying to cheat. Depending on what is to be checked, either a part of the routing header of the first packet or the whole routing header may be saved and compared later on against the header of subsequent packets. If the subsequent packet fails the test, it is dropped. For example, a gateway may compare the final destination address of the first data packet with the final destination address of any subsequent data packet. The length of the routing headers, segment's left field and/or the address fields of subsequent packets may also be checked. The entire routing header of a subsequent data packet may be compared with the routing header of the first data packet.

It shall be appreciated that whilst embodiments of the present invention have been described by using IPv6 Routing Header as an example, the same principles apply to any packet switched addressing method. For example, the filtering routine may be based on IPv4 source routing mechanism.

It shall also be appreciated that whilst embodiments of the present invention have been described in relation to user equipment such as mobile stations, embodiments of the present invention are applicable to any other suitable type of user equipment.

The examples are described with reference to PDP contexts. In alternative embodiments of the invention data packet may be transported on any suitable communication session, for example a Wireless Local Area Network (WLAN) access bearer connected to a policy controlled packet mobile network.

The embodiment of the present invention has been described in the context of a communication system that is based on a GPRS system. This invention is also applicable to any other communication systems and nodes where similar problem may exist. In addition to a gateway node such as a GGSN, similar filtering may be provided for example in wired IP or other packet switched network routers or in a packet data gateway (PDG) of a WLAN access to a policy controlled packet mobile network.

In addition, the term policy decision function (PDF) is intended to cover all controller entities configured to provide restriction parameters such as filtering criteria for controlling communication of packet data.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
   receiving in a node a data packet assigned with a destination address;
   detecting that the destination address does not meet one or more filtering criteria, the filtering criteria comprising updateable filtering criteria content;
   checking if at least one different destination address is assigned for the data packet;
   applying the one or more filtering criteria to the at least one different destination address if the at least one different destination address is assigned for the data packet;
   forwarding the data packet from the node to a next node having the destination address in response to detection that the data packet is assigned with the at least one different destination address that meets the one or more filtering criteria;
   updating the content of the one or more filtering criteria in response to finding that the data packet is assigned with the at least one different destination address that meets the filtering criteria, wherein updating the content of the one or more filtering criteria comprises adding the destination address assigned to the packet that does not meet the one or more filtering criteria to the one or more filtering criteria, the added destination address being a destination address of a router in a transmission path of the data packet; and applying the updated filtering criteria to data packets on a data carrier that follow the data packet containing the at least one different destination address that met the filtering criteria.

2. The method as claimed in claim 1, wherein the checking comprises looking for a header including at least one address.

3. The method as claimed in claim 2, further comprising checking if the at least one address in the header meets the filtering criteria.

4. The method as claimed in claim 1, wherein the checking comprises looking for a routing header.

5. The method as claimed claim 1, wherein the applying the filtering criteria to the at least one different destination address comprises checking if the at least one different destination address meets the filtering criteria that is based on the final destination address of the data packet.

6. The method as claimed claim 1, further comprising providing the node with the filtering criteria when setting up a data carrier for transportation of the data packet.

7. The method as claimed in claim 6, wherein said providing comprises modifying the data carrier comprising a packet data protocol context.

8. The method as claimed in claim 6, further comprising sending the filtering criteria from a communications policy controlling function of a communication system.

9. The method as claimed in claim 1, further comprising providing the node with the filtering criteria when modifying a data carrier for transportation of the data packet.

10. The method as claimed in claim 1, wherein updating the content of the filtering criteria comprises:
adding a destination address of a next router in a transmission path of the data packet to the filtering criteria such that subsequent packets with routing information including the added destination address of the next router will require fewer filtering checks.

11. The method as claimed in claim 10, wherein the updating comprises updating the filtering criteria to allow subsequent data packets with the assigned destination address to be forwarded from the node.

12. The method as claimed in claim 11, wherein the updating comprises carrying the subsequent data packets on the same data carrier.

13. The method as claimed claim 1, further comprising assigning the destination address by an originating entity wherefrom the packets originate.

14. The method as claimed in claim 13, wherein the assigning comprises assigning the destination address by the originating entity, in which the originating entity comprises a mobile user equipment.

15. The method as claimed in claim 1, wherein the receiving comprises receiving in the node, in which the node comprises a gateway.

16. A computer program embodied on computer readable non-transitory memory means, said memory means comprising program code configured to execute a method for transport control in a packet switched communication system, when the program code is run on a computer, the method comprising:
receiving in a node a data packet assigned with a destination address;
detecting that the destination address does not meet one or more filtering criteria;
checking if at least one different destination address is assigned for the data packet;
applying the one or more filtering criteria to the at least one different destination address if the at least one different destination address is assigned for the data packet;
forwarding the data packet from the node to a next node having the destination address in response to detection that the data packet is assigned with the at least one different destination address that meets the one or more filtering criteria;
updating the content of the one or more filtering criteria in response to finding that the data packet is assigned with the at least one different destination address that meets the filtering criteria, wherein updating the content of the one or more filtering criteria comprises adding the destination address assigned to the packet that does not meet the one or more filtering criteria to the one or more filtering criteria, the added destination address being a destination address of a router in a transmission path of the data packet; and
applying the updated filtering criteria to data packets on a data carrier that follow the data packet containing the at least one different destination address that met the filtering criteria.

17. An apparatus, comprising:
an input configured to receive data packets assigned with at least one destination address;
an output configured to forward the data packets to another apparatus based on the at least one destination address;
a controller configured to check if at least one different destination address has been assigned for a data packet of said data packets;
a filter configured to filter destination addresses of received data packets,
wherein, the output is further configured to forward a data packet whose at least one destination address does not meet one or more filtering criteria to the at least one destination address if the data packet is assigned with a different destination address that meets the one or more filtering criteria; and
wherein the filter is further configured to update the content of the one or more filtering criteria in response to finding that the data packet is assigned with the different destination address that meets the filtering criteria, wherein the filter is configured to update the content of the one or more filtering criteria by adding the at least one destination address assigned to the packet that does not meet the one or more filtering criteria to the one or more filtering criteria, the added at least one destination address being a destination address of a router in a transmission path of the data packet, the filter further configured to apply the updated filtering criteria to data packets on a data carrier that follow the data packet containing the different destination address that met the one or more filtering criteria.

18. The apparatus as claimed in claim 17, wherein the filtering criteria is based on final destination addresses of the data packets.

19. The apparatus as claimed in claim 17, wherein the filter configured to update the content of the filtering criteria is configured to:
add a different destination address of a next router in a transmission path of the packets to the filtering criteria such that subsequent packets with routing information including the added destination address of the next router will require fewer filtering checks.

20. The apparatus as claimed in claim 17, wherein the apparatus comprises a gateway.

21. A system, comprising:
an intermediate node configured to receive and forward data packets based on destination addresses of the data packets, the intermediate node being provided with a controller configured to check if at least one different destination address of the destination addresses is assigned for a data packet of the data packets;
a filter configured to filter the destination addresses of the received data packets, the configuration of the intermediate node being such that a data packet of the data packets whose destination address does not meet one or more filtering criteria is forwarded from the intermediate node to the destination address if the data packet is assigned with a different destination address that meets the one or more filtering criteria;
a policy controller configured to assign the one or more filtering criteria for data carriers via the intermediate node; and
wherein the filter is further configured to update the content of the one or more filtering criteria in response to finding that the data packet is assigned with the different destination address that meets the filtering criteria, wherein the filter is configured to update the content of the one or more filtering criteria by adding the destination address assigned to the packet that does not meet the one or more filtering criteria to the one or more filtering criteria, the added destination address being a destination address of a router in a transmission path of the data packet, the filter further configured to apply the updated filtering criteria to data packets on a data carrier that follow the data packet containing the different destination address that met the one or more filtering criteria.

22. The system as claimed in claim 21, wherein the policy controller is configured to provide the intermediate node with the filtering criteria when a data carrier for transportation of the data packet is set-up or modified.

23. The system as claimed in claim 21, wherein the filtering criteria is based on the final destination addresses of data packets.

24. An apparatus, comprising:
receiving means for receiving data packets assigned with at least one destination address;
forwarding means for forwarding the data packets to another node based on the at least one destination address;
checking means for checking if at least one different destination address has been assigned for a data packet of said data packets;
filtering means for filtering destination addresses of received data packets, the configuration of the apparatus being such that a data packet whose at least one destination address does not meet one or more filtering criteria is forwarded from the apparatus to the at least one destination address if the data packet is assigned with a different destination address that meets the one or more filtering criteria, the filtering criteria comprising updateable filtering criteria content;
wherein the filtering means is further configured for updating the content of the one or more filtering criteria in response to finding that the data packet is assigned with the different destination address that meets the filtering criteria, wherein the filtering means is configured to update the content of the one or more filtering criteria by adding the at least one destination address assigned to the packet that does not meet the one or more filtering criteria to the one or more filtering criteria, the added at least one destination address being a destination address of a router in a transmission path of the data packet, the filtering means further configured to apply the updated filtering criteria to data packets on a data carrier that follow the data packet containing the different destination address that has passed the filter.

* * * * *